(12) United States Patent
Osei-Owusu et al.

(10) Patent No.: US 10,414,373 B2
(45) Date of Patent: Sep. 17, 2019

(54) CHILD SAFETY HARNESS

(71) Applicant: Paul Osei-Owusu, Beckenham (GB)

(72) Inventors: Paul Osei-Owusu, Beckenham (GB);
Paul Sein Greenwood, London (GB)

(73) Assignee: Paul Osei-Owusu (GB)

( * ) Notice: Subject to any disclaimer, the term of this patent is extended or adjusted under 35 U.S.C. 154(b) by 0 days.

(21) Appl. No.: 15/563,165

(22) PCT Filed: Mar. 30, 2016

(86) PCT No.: PCT/GB2016/050892
§ 371 (c)(1),
(2) Date: Sep. 29, 2017

(87) PCT Pub. No.: WO2016/156839
PCT Pub. Date: Oct. 6, 2016

(65) Prior Publication Data
US 2018/0079386 A1   Mar. 22, 2018

(30) Foreign Application Priority Data
Mar. 31, 2015   (GB) .................................. 1505489.3

(51) Int. Cl.
*B60R 22/10* (2006.01)
*B60R 22/12* (2006.01)
*B60R 22/30* (2006.01)

(52) U.S. Cl.
CPC ............ *B60R 22/105* (2013.01); *B60R 22/12* (2013.01); *B60R 22/30* (2013.01)

(58) Field of Classification Search
CPC ....... B60R 22/105; B60R 22/12; B60R 22/14; B60R 22/30; A62B 35/0012; B64D 25/06
See application file for complete search history.

(56) References Cited

U.S. PATENT DOCUMENTS 4,226,474 A * 10/1980 Rupert ................. A47D 15/006
297/465
4,840,144 A *  6/1989 Voorhees .............. B60R 22/105
119/857

(Continued)

FOREIGN PATENT DOCUMENTS

CN     202952851 U      5/2013
DE        4236055 A1 *  4/1994  ............. B60N 2/265

(Continued)

OTHER PUBLICATIONS

U.K.Search Report; dated Aug. 12, 2015; 4 pages.
International Search Report; dated Jun. 21, 2016; 6 pages.

*Primary Examiner* — Laura Freedman
(74) *Attorney, Agent, or Firm* — Renner Kenner Greive Bobak Taylor & Weber

(57) ABSTRACT

A child safety harness (100) is provided, for use in conjunction with a three-point adult seatbelt (200) that has a diagonally extending chest section (202) and a horizontally extending lap section (204). The harness (100) comprises a first coupling arrangement (116) and a second coupling arrangement (126). The first coupling arrangement (116) is provided at the rear of the harness (100) for removably coupling the harness (100) to a diagonally extending chest section (202) of an adult seatbelt (200). The second coupling arrangement (126) is provided at the rear of the harness (100) for removably coupling the harness (100) to a horizontally extending lap section (204) of an adult seatbelt (200).

20 Claims, 6 Drawing Sheets

(56) References Cited

U.S. PATENT DOCUMENTS

| | | | | |
|---|---|---|---|---|
| 5,074,588 A | * | 12/1991 | Huspen | B60R 22/105 |
| | | | | 280/801.1 |
| 5,190,306 A | * | 3/1993 | Nauman | B62J 1/167 |
| | | | | 224/159 |
| 5,527,094 A | * | 6/1996 | Hiramatsu | B60N 2/2806 |
| | | | | 297/250.1 |
| 5,628,548 A | | 5/1997 | Lacoste | |
| 6,174,032 B1 | * | 1/2001 | Conaway | B60N 2/265 |
| | | | | 297/483 |
| 6,314,578 B1 | * | 11/2001 | Masuda | B60N 2/265 |
| | | | | 2/102 |
| 2007/0182235 A1 | | 8/2007 | Bueno et al. | |
| 2015/0069812 A1 | * | 3/2015 | Kim | B60R 22/14 |
| | | | | 297/465 |

FOREIGN PATENT DOCUMENTS

| | | | |
|---|---|---|---|
| EP | 1138560 A1 | 10/2001 | |
| EP | 1147717 A1 | 10/2001 | |
| JP | 2000225918 A * | 8/2000 | B60R 22/105 |
| JP | 2001151074 A * | 6/2001 | |
| JP | 2001180432 A * | 7/2001 | |
| KR | 1020120118893 | 10/2012 | |
| KR | 101382542 B | 4/2014 | |
| WO | 0046080 | 8/2000 | |
| WO | 2008032047 A1 | 3/2008 | |

* cited by examiner

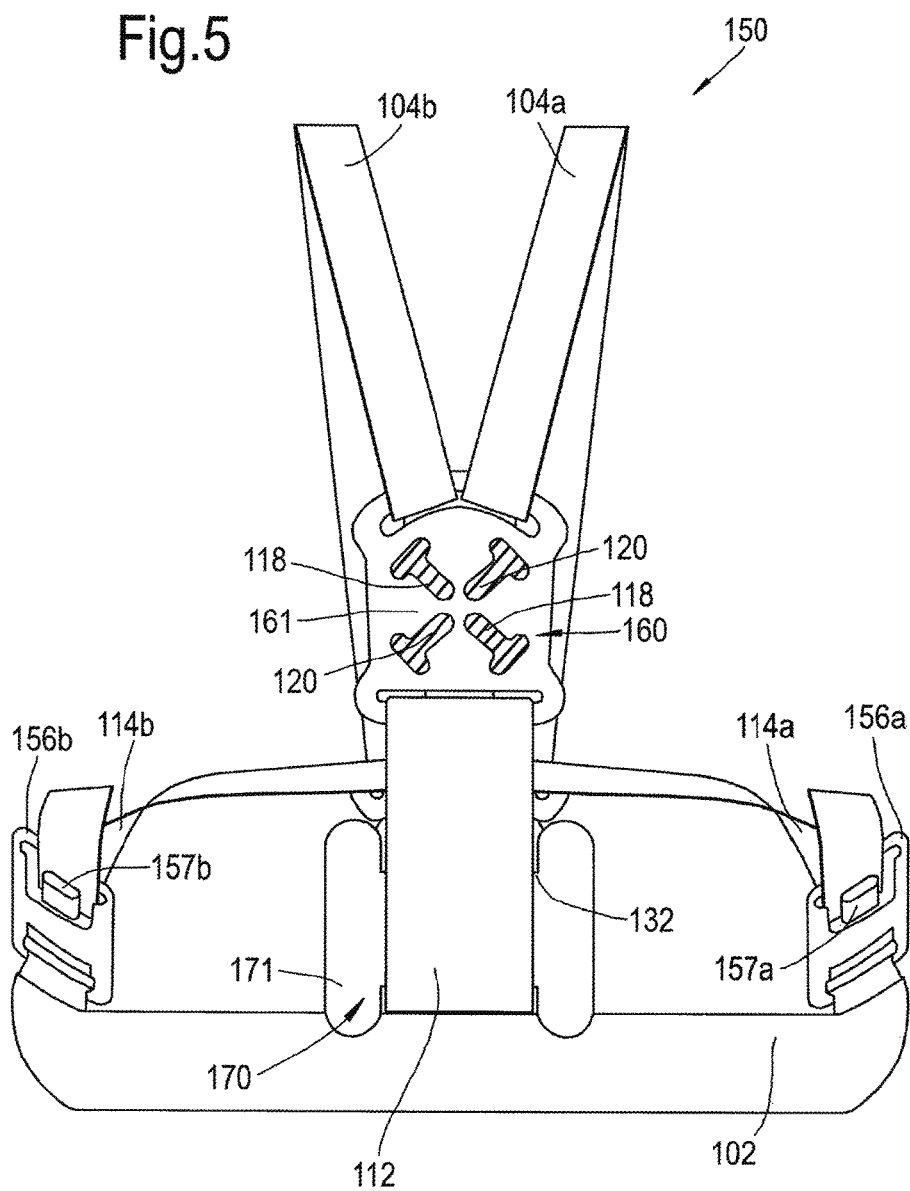

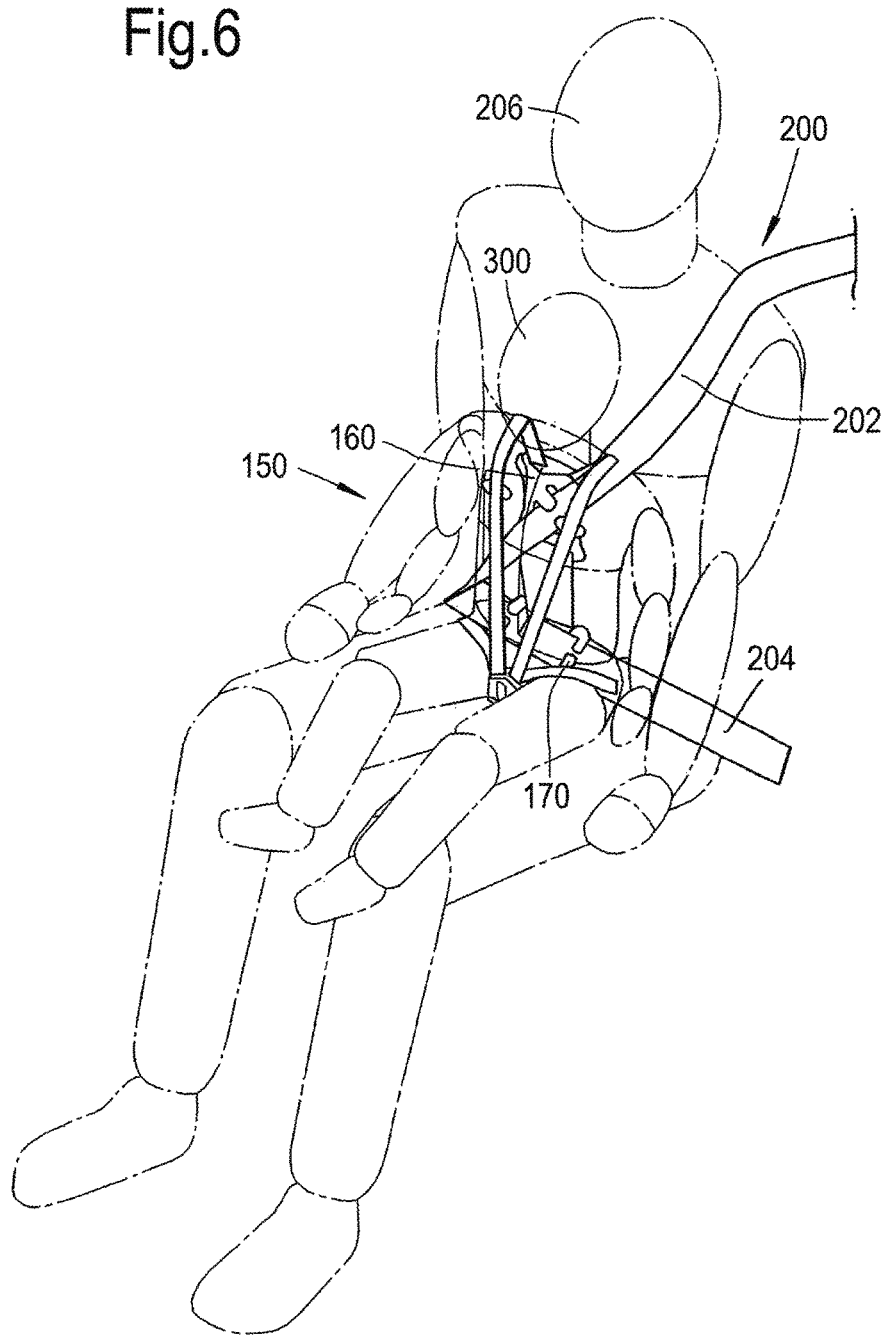

CHILD SAFETY HARNESS

FIELD OF THE INVENTION

The present invention relates to a child safety harness. In particular, it relates to such a harness which may be used in place of a child car seat when none is available.

BACKGROUND OF THE INVENTION

For safety and comfort reasons, children are usually transported in cars using child car seats. The child car seat may be reward-facing for smaller infants, who are less able to support the weights of their heads, or forward-facing for larger children. The child is usually restrained within the child car seat by an integral seatbelt, and the child car seat is usually fixed to the back seat of the car using the car's adult seatbelt or using an ISOFIX base. Child car seats tend to be the safest way to transport children and, if available, their use is usually required by law. However, child car seats can be bulky and they are not always available for use, for example in private or public hire vehicles such as taxis. Child car seats also do not tend to be suitable for use on public transport such as buses, coaches, trains or aeroplanes. In these cases where a child car seat cannot be used, the child may instead be restrained using an adult seatbelt or may be transported on an adult's lap. However, these are not particularly safe ways to transport a child.

It is therefore a principal aim of this invention to provide a convenient temporary replacement for a suitable child car seat when transporting a child.

BRIEF SUMMARY OF THE INVENTION

Thus, according to the present invention there is provided a child safety harness for use in conjunction with a three-point adult seatbelt that has a diagonally extending chest section and a horizontally extending lap section, the harness comprising: a first coupling arrangement at the rear of the harness for removably coupling the harness to a diagonally extending chest section of an adult seatbelt; and a second coupling arrangement at the rear of the harness for removably coupling the harness to a horizontally extending lap section of an adult seatbelt.

As will be appreciated from the above, the present invention provides a convenient and secure way to transport a child when a child car seat is not available for use. In particular, the child can be restrained by the harness, and the harness can be firmly coupled to an adult's seatbelt at two locations by the first and second coupling arrangements. The harness can also be used, and preferably is used, whilst an adult is wearing the seatbelt, with the child sitting on the adult's lap. Also, since the present invention is a harness rather than a child car seat, the present invention is extremely portable and may be easily carried by the child's guardian, by a taxi, or by other transport providers.

As will be discussed in more detail below, the first coupling arrangement may also be able to be removably coupled to a diagonally or horizontally extending chest strap of a corresponding adult harness, which may be used in lieu of a three-point adult seatbelt. Similarly, the second coupling arrangement may also be able to be removably coupled to a horizontally extending lap strap of a corresponding adult harness.

In preferred embodiments, the first coupling arrangement is able to be coupled to a chest section of an adult seatbelt that extends diagonally along a first direction in use (e.g. that extends diagonally from the adult's left shoulder towards the adult's right hip in use), and is also able alternatively to be coupled to a chest section of an adult seatbelt that extends diagonally along a second direction in use (e.g. that extends diagonally from the adult's right shoulder towards the adult's left hip in use), with the second direction being crosswise to the first direction. This allows the harness to be used regardless of the diagonal orientation of the adult seatbelt.

In preferred embodiments, the first coupling arrangement comprises a first pair of spaced-apart (opposed) elongate members that extend diagonally towards one another along a first direction, wherein in use a chest section of an adult seatbelt that extends diagonally along a second direction that is crosswise to the first direction is able to be inserted through the space between the first pair and is then retained by hooking onto the first pair. This provides a secure and convenient way to couple the first coupling arrangement to an adult seatbelt, which typically would not have a free end. Similarly, the first coupling arrangement preferably further comprises a second pair of spaced-apart (opposed) elongate members that extend diagonally towards one another along the second direction, wherein in use a chest section of an adult seatbelt that extends diagonally along the first direction is able to be inserted through the space between the second pair and is then retained by hooking onto the second pair.

As will be appreciated, the two pairs of elongate members may together define a substantially Maltese cross shaped opening in the first coupling arrangement. These embodiments provide a secure and convenient way to couple the first coupling arrangement to adult seatbelts having different diagonal orientations. These embodiments are also particularly advantageous in that they allow the first coupling arrangement to be removably coupled to a horizontally extending chest strap of a corresponding adult harness. For example, the horizontally extending chest strap of the adult harness may be inserted through the space between the first and second pairs and may then be retained by hooking onto the first and second pairs.

In preferred embodiments, the first coupling arrangement further comprises a tab between each pair of adjacent (i.e. non-opposed) elongate members. These tabs can help to guide the chest section of the adult seatbelt into place and then retain the chest section in place. These tabs may each be substantially triangular and may have a rounded apex. Again, the pairs of elongate members and the tabs may together define a substantially Maltese cross shaped opening in the first coupling arrangement.

In preferred embodiments, the second coupling arrangement comprises a third pair of spaced-apart (opposed) elongate members that extend vertically towards one another, wherein in use a horizontally extending lap section of an adult seatbelt is able to be inserted between the third pair and is then retained by hooking onto the third pair. Again, this provides a secure and convenient way to couple the second coupling arrangement to an adult seatbelt. The third pair may be provided by a first substantially C-shaped section of the second coupling arrangement. Similarly, the second coupling arrangement preferably further comprises a fourth pair of spaced-apart (opposed) elongate members that extend vertically towards one another, wherein in use a horizontally extending lap section of an adult seatbelt is able to be inserted between the fourth pair and is then retained by hooking onto the fourth pair, the fourth pair preferably being spaced horizontally from the third pair. The fourth pair may be provided by a second substantially C-shaped section of the second coupling arrangement, which may be substantially a mirror image of the first substantially C-shaped section. These embodiments provide an even more secure way of coupling the harness to an adult seatbelt. In some embodiments, the second coupling arrangement further comprises a horizontally extending member, the fourth pair being spaced horizontally from the third pair by the horizontally extending member.

In certain preferred embodiments, the first coupling arrangement and/or the second coupling arrangement is provided by a substantially planar structure. These embodiments provide a simple but effective way to provide the features of the first and/or second coupling arrangement. For example, the first coupling arrangement may be provided by an appropriately shaped plate, e.g. a plate having a substantially Maltese cross shaped opening. Similarly, the second coupling arrangement may be provided by an appropriately shaped plate, e.g. a plate having back-to-back substantially C-shaped end sections, which may be spaced horizontally from one another by a horizontally extending member.

In alternative preferred embodiments, the first coupling arrangement and/or the second coupling arrangement further comprises a backing plate arranged in a plane parallel to and behind said elongate members and spaced therefrom, such that each said coupling arrangement is adapted to receive a section of an adult seatbelt between said elongate members and said backing plate. As will be appreciated, in the first coupling arrangement, the backing plate will preferably underlie the substantially Maltese cross shaped opening. In the second coupling arrangement, the backing plate will preferably underlie the opening in the substantially C-shaped section.

The first coupling arrangement may be provided by a first unitary structure and/or the second coupling arrangement may be provided by a second unitary structure. The first coupling arrangement may be formed from metallic material and/or the second coupling arrangement may be formed from metallic material, although other suitably strong and rigid materials may be used.

The harness may further comprise a first coupling pad, wherein in use the first coupling pad is positioned between the first coupling arrangement and the child, so as to provide additional comfort for the child. Similarly, the harness may further comprise a second coupling pad, wherein in use the second coupling pad is positioned between the second coupling arrangement and the child. The first and/or second coupling pad may be removable so as to allow cleaning of that pad.

The harness may be at least a three-point harness. Thus, in preferred embodiments, the harness comprises: a (e.g. flexible) base that extends from the front of the harness to the rear of the harness, wherein in use the child sits on the base; first and second shoulder straps for positioning over the child's right and left shoulders respectively, rear sections of the shoulder straps being connected to the base at the rear of the harness; and a buckle arrangement for removably connecting front sections of the shoulder straps to the base at the front of the harness. A front portion of the base, or a front strap that is connected to the front of the base, may be connected to the buckle arrangement. In use, the front portion and/or front strap may extend between the child's legs. The first shoulder strap and/or the second shoulder strap is preferably adjustable in length.

The harness preferably further comprises first and second shoulder pads attached respectively to the first and second shoulder straps. The first and second shoulder pads may be removably and/or slidably attached respectively to the first and second shoulder straps. This can allow the shoulder pads to be removed for cleaning and/or may allow the position of the shoulder pads to be adjusted. Each shoulder pad may comprise, for example, a padded sleeve provided around the shoulder strap, for example with the sleeve being held together by one or more fixings such as press studs.

In particularly preferred embodiments, the harness is at least a five-point harness. Thus, the harness may further comprise first and second side straps provided on respective sides of the harness, wherein in use the side straps are positioned around the child's right and left sides respectively, the side straps connecting the buckle arrangement at the front of the harness to the base at the rear of the harness.

The buckle arrangement preferably comprises at least three interconnecting parts that may be connected together to secure the buckle arrangement together. The first side strap and the first shoulder strap may each be connected to, or may together form part of a first contiguous strap that passes through, a first part of the buckle arrangement. Similarly, the second side strap and the second shoulder strap may each be connected to, or may together form part of a second contiguous strap that passes through, a second part of the buckle arrangement. A third part of the buckle arrangement may be connected to the base, for example via a front strap connected to the base. The interconnecting parts are preferably released by pressing a button provided on the buckle arrangement, e.g. provided on the third part of the buckle arrangement.

The harness may further comprise a buckle pad, wherein in use the buckle pad is positioned between the buckle arrangement and the child, so as to provide additional comfort for the child. The buckle pad may be removable so as to allow cleaning of that pad. The pad is preferably arranged such that the interconnecting parts and/or release button of the buckle arrangement are exposed for operation.

In preferred embodiments, the harness further comprises a back strap that connects the first and second shoulder straps to the base. The first coupling arrangement may connect the first and second shoulder straps to the back strap. The second coupling arrangement may also be attached to the back strap, for example the horizontally extending member of the second coupling arrangement may extend through the back strap.

In some cases, such as in taxis, a suitable adult seatbelt may be available. However, in other cases, such as on public transport, a suitable adult seatbelt may not be available. Thus, as discussed above, the child safety harness may be provided in combination with an adult harness to be worn by an adult, the adult harness comprising a diagonally or horizontally extending chest strap for coupling to the first coupling arrangement of the child safety harness, and/or a horizontally extending lap strap for coupling to the second coupling arrangement of the child safety harness. This allows the child safety harness to be used even when a suitable adult seatbelt is not provided.

As will be appreciated, the term "connect" and its equivalents (e.g. "connects", "connecting", "connected", etc.) as used herein may be a reference either to a direct connection (i.e. the features in question are directly joined to one another) or to an indirect connection (i.e. the features in question are indirectly joined to one another via one or more other features).

BRIEF DESCRIPTION OF THE SEVERAL VIEWS OF THE INVENTION

By way of example only, embodiments of the invention will now be described in detail with reference being made to the accompanying drawings in which:

FIG. 5 shows a rear view of the child safety harness of FIG. 4; and

FIG. 6 shows the child safety harness of FIGS. 4 and 5 in use.

DETAILED DESCRIPTION OF THE INVENTION

Figure 1:
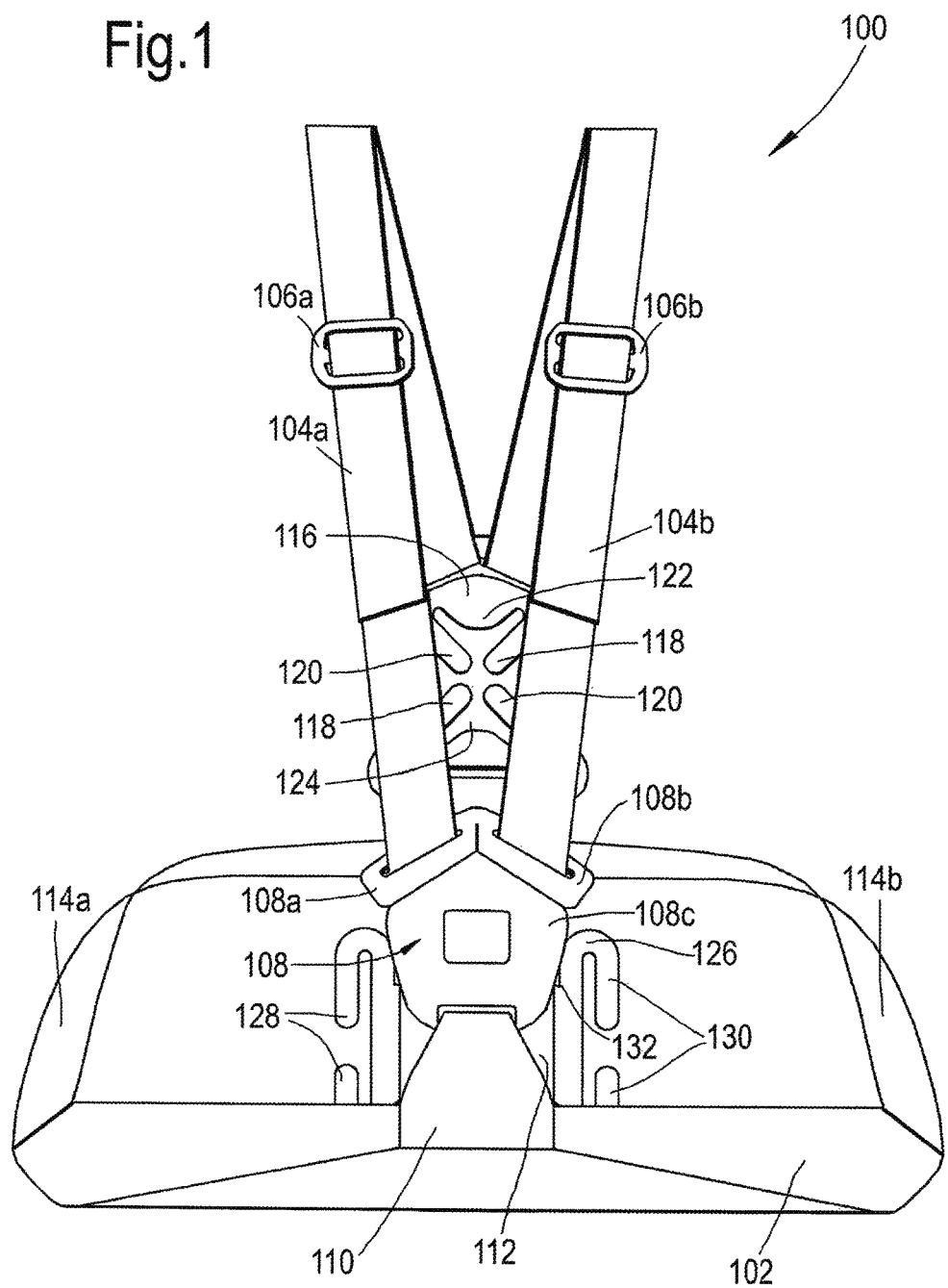
FIG. 1 shows a front view of a child safety harness according to a first preferred embodiment of the present invention.
Figure 2:
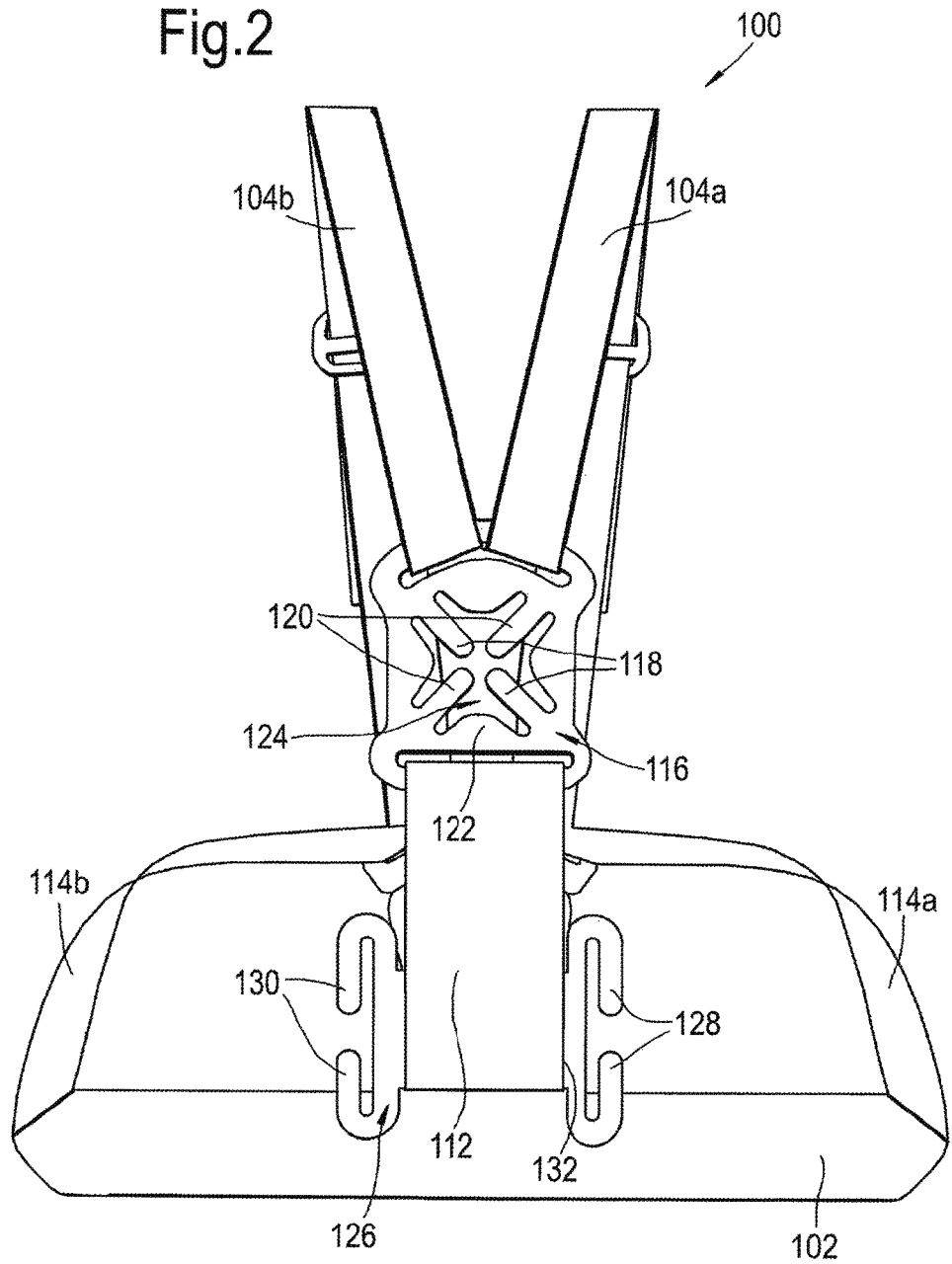
FIG. 2 shows a rear view of the child safety harness of FIG. 1.

Reference will initially be made to FIGS. 1 and 2, which respectively show front and rear views of a first preferred embodiment of child safety harness 100 for use in conjunction with a three-point adult seatbelt. The harness 100 comprises a flexible fabric base 102 on which a child may sit. The base 102 extends from the front of the harness 100 to the rear of the harness 100. The harness 100 also comprises shoulder straps 104a-b for positioning over the child's right and left shoulders respectively. The shoulder straps 104a-b are adjustable in length using buckles 106a-b. Although not shown, the harness 100 may comprise removable shoulder pads attached to the respective shoulder straps 104a-b. Each shoulder pad may take the form of a padded sleeve that is held around its shoulder strap 104a-b by fixings in the form of press studs.

The harness 100 also comprises a buckle arrangement 108 formed of three interconnecting parts 108a-108c that removably connect front sections of the shoulder straps 104a-b to the base 102 at the front of the harness 100 via a front strap 110 connected to the base 102. In use, the front strap 110 extends between the child's legs. Although not shown, the harness 100 may comprise a removable buckle pad, which in use is positioned between the buckle arrangement 108 and the child to provide additional comfort for the child. Rear sections of the shoulder straps 104a-b are permanently connected to the base 102 at the rear of the harness 100 via a back strap 112. The harness 100 further comprises side straps 114a-b provided on respective sides of the harness 100. The side straps 114a-b connect the buckle arrangement 108 at the front of the harness 100 to the base 102 at the rear of the harness 100. In this embodiment, the side straps 114a-b and the shoulder straps 104a-b form part of contiguous webbing straps that pass through respective first and second parts 108a-b of the buckle arrangement 108.

The harness 100 further comprises a first coupling arrangement 116 at the rear of the harness 100 for removably coupling the harness 100 to a diagonally extending chest section of an adult seatbelt. The first coupling arrangement 116 also connects the shoulder straps 104a-b to the back strap 112. Although not shown, the harness 100 may comprise a removable first coupling pad, which in use is positioned between the first coupling arrangement 116 and the child to provide additional comfort for the child. The first coupling arrangement 116 is provided by a planar, unitary, metallic plate that comprises a first pair 118 of spaced-apart elongate members that extend diagonally towards one another along a first direction. In use, a chest section of an adult seatbelt that extends diagonally along a second direction, which is crosswise to the first direction, is able to be inserted through the space between the first pair 118 and is then retained by hooking onto the first pair 118. The plate of the first coupling arrangement 116 further comprises a second pair 120 of spaced-apart elongate members that extend diagonally towards one another along the second direction. In use, a chest section of an adult seatbelt that extends diagonally along the first direction is alternatively able to be inserted through the space between the second pair 120 and is then retained by hooking onto the second pair 120. This allows the harness 100 to be used regardless of the diagonal orientation of the adult seatbelt.

In this embodiment, the first coupling arrangement 116 further comprises a substantially triangular tab 122 between each pair of adjacent elongate members. Although four tabs are present, only one tab 122 is indicated in FIG. 2 for the sake of clarity. The four tabs 122 help to guide the chest section of the adult seatbelt into place and then retain the chest section in place. As can be seen in FIG. 2, the pairs 118, 120 of elongate members and the tabs 122 together define a substantially Maltese cross shaped opening 124 in the first coupling arrangement 116.

The harness 100 also comprises a second coupling arrangement 126 at the rear of the harness for removably coupling the harness 100 to a horizontally extending lap section of an adult seatbelt. Although not shown, the harness 100 may comprise a removable second coupling pad, which in use is positioned between the second coupling arrangement 126 and the child to provide additional comfort for the child. The second coupling arrangement 126 is provided by a planar, unitary, metallic plate that comprises a third pair 128 of spaced-apart elongate members that extend vertically towards one another. The third pair 128 is provided by a substantially C-shaped section of the second coupling arrangement 126. Similarly, the plate of the second coupling arrangement 126 comprises a fourth pair 130 of spaced-apart elongate members that extend vertically towards one another. Again, the fourth pair 130 is provided by a substantially C-shaped section of the second coupling arrangement 126. The third pair 128 and fourth pair 130 are spaced horizontally from one another by a horizontally extending member 132 that passes through the back strap 112. In use, a horizontally extending lap section of an adult seatbelt is able to be inserted between the third pair 128 and between the fourth pair 130 and is then retained by hooking onto those pairs.

Figure 3:
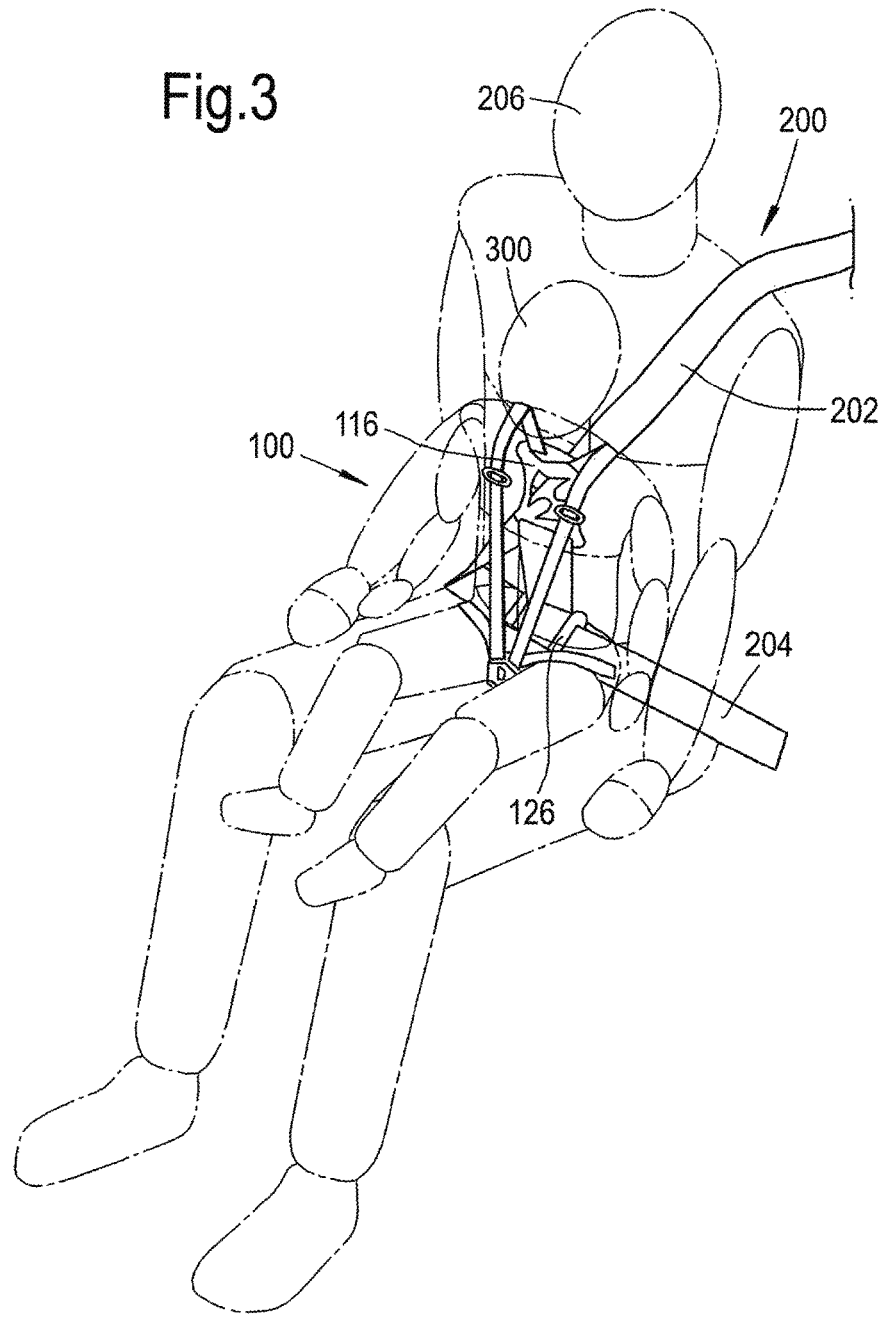
FIG. 3 shows the child safety harness of FIGS. 1 and 2 in use.

FIG. 3 shows the harness 100 being used in conjunction with an adult seatbelt 200 that comprises a diagonally extending chest section 202 and a horizontally extending lap section 204. In use, a child 300 is placed in the harness 100 with: the child 300 being able to sit on the base 102 of the harness 100, the front strap 110 between the child's legs; the shoulder straps 104a-b of the harness 100 over the child's shoulders; the side straps 114a-b of the harness 100 around the child's sides; and the back strap 112 of the harness 100 down the child's back. The parts 108a-c of the buckle arrangement 108 are then connected together at the front of the child 300 and the lengths of the shoulder straps 104a-b are adjusted to secure the child within the harness 100.

An adult 206 then puts on the adult seatbelt 200 and places the child 300 on their lap. The second coupling arrangement 126 is then coupled to the lap section 204 of the adult seatbelt 200 and the first coupling arrangement 116 is then coupled to the chest section 202 of the adult seatbelt 200. Alternatively, the harness 100 may be coupled to an adult seatbelt 200 being worn by the adult 206 prior to the child being placed on the adult's lap and secured within the harness 100. In either case, the harness 100 allows the child 300 to be transported on the adult's lap in a safer manner than if the harness 100 were not used.

Figure 4:
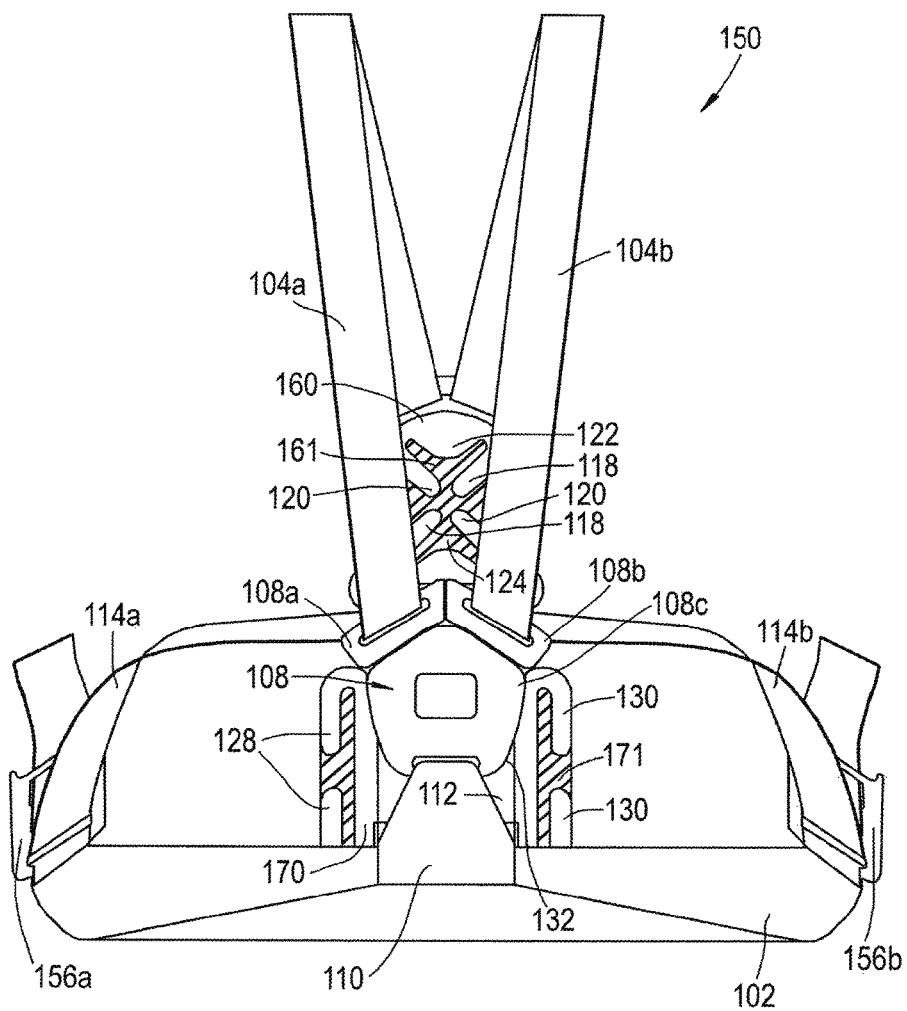
FIG. 4 shows a front view of a child safety harness according to a second preferred embodiment of the present invention.

Referring now to FIGS. 4 and 5, there is shown, respectively, front and rear views of a second preferred embodiment of child safety harness 150 for use in conjunction with a three-point adult seatbelt. The second embodiment of harness 150 is the same in most respects as the first embodiment of harness 100 described above with reference to FIGS. 1 to 3, and like reference numerals are used to identify like components. The second embodiment of harness 150 differs from the first embodiment of harness 100 however in the following respects:

The first coupling arrangement 160 of the harness 150 is provided with a backing plate 161. The backing plate 161 is arranged behind the first and second opposed pairs of elongate members 118, 120 in a plane parallel thereto and spaced therefrom. The backing plate 161 underlies the substantially Maltese cross-shaped opening 124, and may itself be of corresponding or similar shape.

The second coupling arrangement 170 of this embodiment of harness 150 is also provided with a backing plate 171. The backing plate 171 is arranged behind the third and fourth opposed pairs of elongate members 128, 130 in a plane parallel thereto and spaced therefrom. As can be seen in FIG. 4, the backing plate 171 underlies the openings in the substantially C-shaped sections of the second coupling arrangement 170.

As illustrated in FIG. 6, the backing plate 161 on the first coupling arrangement 160 serves to ensure that the diagonal chest section 202 of the adult seatbelt 200 can only be inserted into the opening 124 in the first coupling arrangement 160 from the front thereof, and not from the rear. Similarly, the backing plate 171 on the second coupling arrangement 170 serves to ensure that the lap section 204 of the adult seatbelt 200 can only be inserted into the openings in the second coupling arrangement 170 from the front thereof, and not from the rear.

The adult seatbelt 200 must therefore pass between the child 300 and the harness 150 (i.e. inside the harness 150) in order to secure the child 300 to the adult 200. This provides additional security and stability to the child 300.

Referring once more to FIGS. 4 and 5, it can be seen that the harness 150 differs from the first embodiment of harness 100 in one further respect, namely that the shoulder strap buckles 106a, 106b are absent. Instead, the shoulder straps 104a, 104b, which are contiguous with the side straps 114a, 114b, are adjustable via strap adjusters 156a, 156b located on the side straps 114a, 114b. As can be seen in FIG. 5, the strap adjusters 156a, 156b are operable by means of a push button 157a, 157b.

The invention claimed is:

1. A child safety harness for use in conjunction with a three-point adult seatbelt that has a diagonally extending chest section and a horizontally extending lap section, the harness having a front and a rear, and comprising:
   a first coupling arrangement at the rear of the harness for removably coupling the harness to the diagonally extending chest section of the adult seatbelt, the first coupling arrangement having an opening therein, the first coupling arrangement comprising:
   a first pair of spaced-apart elongate members that extend diagonally towards one another along a first direction and that partially defines a shape of the opening, wherein in use the chest section of the adult seatbelt, if extending diagonally along a second direction that is crosswise to said first direction, is able to be inserted through the opening via a space between the first pair of spaced-apart elongate members and is then retained by hooking onto the first pair of spaced-apart elongate members;
   a second pair of spaced-apart elongate members that extend diagonally towards one another along said second direction and that partially define the shape of the opening, wherein in use the chest section of the adult seatbelt, if extending diagonally along the first direction, is able to be inserted through the opening via a space between the second pair of spaced-apart elongate members and is then retained by hooking onto said second pair of spaced-apart elongate members; and
   a tab between each pair of spaced-apart elongate members; and
   a second coupling arrangement at the rear of the harness for removably coupling the harness to the horizontally extending lap section of the adult seatbelt.

2. A child safety harness as claimed in claim 1, wherein the first coupling arrangement is able to be coupled to the chest section of the adult seatbelt if extending diagonally along the first direction in use, and is also able alternatively to be coupled to the chest section of the adult seatbelt if extending diagonally along the second direction in use.

3. A child safety harness as claimed in claim 1, wherein the second coupling arrangement comprises a third pair of spaced-apart elongate members that extend vertically towards one another, and wherein in use the horizontally extending lap section of the adult seatbelt is able to be inserted between the third pair of spaced-apart elongate members and is then retained by hooking onto the third pair of spaced-apart elongate members.

4. A child safety harness as claimed in claim 3, wherein the second coupling arrangement further comprises a fourth pair of spaced-apart elongate members that extend vertically towards one another, wherein in use the horizontally extending lap section of the adult seatbelt is able to be inserted between the fourth pair of spaced-apart elongate members and is then retained by hooking onto the fourth pair of spaced-apart elongate members, the fourth pair being spaced horizontally from the third pair of spaced-apart elongate members.

5. A child safety harness as claimed in claim 4, wherein the second coupling arrangement further comprises a horizontally extending member, the fourth pair of spaced-apart elongate members being spaced horizontally from the third pair of spaced-apart elongate members by the horizontally extending member.

6. A child safety harness as claimed in claim 1, wherein at least one of the first coupling arrangement and the second coupling arrangement is provided by a substantially planar structure.

7. A child safety harness as claimed in claim 1, wherein at least one of the first coupling arrangement and the second coupling arrangement further comprises a backing plate arranged in a plane parallel to and behind said elongate members and spaced therefrom, such that each said coupling arrangement is adapted to receive a section of the adult seatbelt between said elongate members and said backing plate.

8. A child safety harness as claimed in claim 1, wherein at least one of the first coupling arrangement and the second coupling arrangement is provided by a unitary structure.

9. A child safety harness as claimed in claim 1, wherein at least one of the first coupling arrangement and the second coupling arrangement is formed from metallic material.

10. A child safety harness as claimed in claim 1, further comprising:

a base that extends from the front of the harness to the rear of the harness, wherein in use the base is configured to be sat on by a child;

first and second shoulder straps configured to be positioned over the child's right and left shoulders respectively, rear sections of the shoulder straps being connected to the base at the rear of the harness; and a buckle arrangement for removably connecting front sections of the shoulder straps to the base at the front of the harness.

11. A child safety harness as claimed in claim 10, wherein at least one of the first shoulder strap and the second shoulder strap is adjustable in length.

12. A child safety harness as claimed in claim 10, further comprising first and second shoulder pads attached respectively to the first and second shoulder straps.

13. A child safety harness as claimed in claim 10, further comprising first and second side straps provided on respective sides of the harness, wherein in use the side straps are configured to be positioned around the child's right and left sides respectively, the side straps connecting the buckle arrangement at the front of the harness to the base at the rear of the harness.

14. A child safety harness as claimed in claim 13, wherein the first side strap and the first shoulder strap form part of a first contiguous strap that passes through a first part of the buckle arrangement, and the second side strap and the second shoulder strap form part of a second contiguous strap that passes through a second part of the buckle arrangement.

15. A child safety harness as claimed in claim 10, further comprising a back strap that connects the first and second shoulder straps to the base.

16. A child safety harness as claimed in claim 15, wherein the first coupling arrangement connects the first and second shoulder straps to the back strap.

17. A child safety harness as claimed in claim 15, wherein the second coupling arrangement is attached to the back strap.

18. A child safety harness as claimed in claim 1, further comprising at least one of:

a first coupling pad that, in use, is configured to be positioned between the first coupling arrangement and a child; and a second coupling pad that, in use, is configured to be positioned between the second coupling arrangement and the child.

19. A child safety harness as claimed in claim 18, wherein at least one of the first coupling pad and the second coupling pad is removable from the harness.

20. A child safety harness as claimed in claim 1 in combination with an adult harness is configured to be worn by an adult, the adult harness comprising at least one of:

a diagonally extending chest strap for coupling to the first coupling arrangement of the child safety harness; and a horizontally extending lap strap for coupling to the second coupling arrangement of the child safety harness.

* * * * *